(12) United States Patent
Dignam et al.

(10) Patent No.: US 10,565,899 B1
(45) Date of Patent: Feb. 18, 2020

(54) RECONFIGURABLE LEARNING AID FOR PERFORMING MULTIPLE SCIENCE EXPERIMENTS

(71) Applicant: Mentis Sciences, Inc., Manchester, NH (US)

(72) Inventors: John J. Dignam, Methuen, MA (US); Dennis P. Chou, Townson, MA (US); Glen C. Bousquet, Tewksbury, MA (US)

(73) Assignee: Mentis Sciences, Inc., Manchester, NH (US)

( * ) Notice: Subject to any disclaimer, the term of this patent is extended or adjusted under 35 U.S.C. 154(b) by 769 days.

(21) Appl. No.: 15/062,690

(22) Filed: Mar. 7, 2016

Related U.S. Application Data

(60) Provisional application No. 62/177,119, filed on Mar. 6, 2015.

(51) Int. Cl.
| | |
|---|---|
| *G09B 23/06* | (2006.01) |
| *G09B 23/10* | (2006.01) |
| *G09B 23/16* | (2006.01) |
| *G09B 23/18* | (2006.01) |
| *G09B 5/02* | (2006.01) |

(52) U.S. Cl.
CPC ............... *G09B 23/06* (2013.01); *G09B 5/02* (2013.01); *G09B 23/10* (2013.01); *G09B 23/16* (2013.01); *G09B 23/181* (2013.01)

(58) Field of Classification Search
CPC ........ G09B 23/06; G09B 23/10; G09B 23/16; G09B 23/181
USPC ......................................................... 434/300
See application file for complete search history.

(56) References Cited

U.S. PATENT DOCUMENTS

| | | | | | |
|---|---|---|---|---|---|
| 1,838,394 | A | * | 12/1931 | Hansel ................... | G09B 23/00 434/433 |
| 3,629,957 | A | * | 12/1971 | Somashekar .......... | G09B 23/10 200/61.11 |
| 3,636,640 | A | * | 1/1972 | Chambers .............. | G09B 23/10 434/302 |
| 3,650,049 | A | * | 3/1972 | Chambers .............. | G09B 23/10 273/120 R |
| 3,774,317 | A | * | 11/1973 | Balamuth .............. | G09B 23/06 434/302 |
| 3,955,788 | A | * | 5/1976 | Delage ..................... | B01L 9/00 248/228.3 |
| 4,602,173 | A | * | 7/1986 | Briscoe ................ | G09B 23/181 310/1 |
| 5,192,212 | A | * | 3/1993 | Kim ....................... | G09B 23/10 434/284 |

(Continued)

*Primary Examiner* — Michael C Grant
(74) *Attorney, Agent, or Firm* — James Creighton Wray

(57) ABSTRACT

This invention is an apparatus consisting of components that can be assembled and reassembled in various configurations allowing students to perform multiple physics and engineering experiments, with sensors and electronics integrated into the apparatus that allowing extraction of data via integrated data links, while computing and displaying results graphically in near real time. The principal component of the system is a linear drive system with a movable carriage, the position of which is measureable by various rotary and linear encoders. Load cells are able to measure forces of compression and tension. Temperature and Pressure sensors are able to measure gas pressure and the thermal conductivity of materials. The various components of this flexible educational tool can be disassembled and stored in a portable "toolkit", the size of a small briefcase.

21 Claims, 7 Drawing Sheets

(56) References Cited

U.S. PATENT DOCUMENTS

| | | | | |
|---|---|---|---|---|
| 6,015,296 A * | 1/2000 | Fenkanyn | ............... | G09B 23/06 434/276 |
| 6,443,736 B1 * | 9/2002 | Lally | ...................... | G09B 23/10 434/300 |
| 6,708,385 B1 * | 3/2004 | Lemelson | ................ | B23Q 7/03 29/563 |
| 7,260,906 B1 * | 8/2007 | Herbstritt | ............... | G09B 19/00 40/426 |
| 7,353,715 B2 * | 4/2008 | Myers | ..................... | G01N 3/32 73/837 |
| 7,621,171 B2 * | 11/2009 | O'Brien | ............... | G01N 1/2202 73/23.27 |
| 2001/0030175 A1 * | 10/2001 | Bong | ................... | B23K 9/0213 219/73.1 |
| 2003/0028361 A1 * | 2/2003 | Nelson | ................... | G09B 23/00 703/6 |
| 2004/0023199 A1 * | 2/2004 | Lally | ...................... | G09B 23/10 434/300 |
| 2004/0115594 A1 * | 6/2004 | Schoendorff | .......... | G09B 23/10 434/67 |
| 2005/0023262 A1 * | 2/2005 | Bong | ................... | B23K 9/0203 219/130.5 |
| 2005/0046584 A1 * | 3/2005 | Breed | .................... | B60C 11/24 340/13.31 |
| 2005/0159840 A1 * | 7/2005 | Lin | ......................... | B23P 6/002 700/245 |
| 2007/0256503 A1 * | 11/2007 | Wong | ...................... | G01N 3/34 73/812 |
| 2009/0305216 A1 * | 12/2009 | Ueyama | ................ | G09B 23/12 434/300 |
| 2010/0176107 A1 * | 7/2010 | Bong | .................... | B23K 25/00 219/137 R |
| 2010/0201215 A1 * | 8/2010 | Herbstritt | ............... | G09B 23/06 310/80 |
| 2012/0189993 A1 * | 7/2012 | Kindig | ................... | G09B 19/24 434/234 |
| 2013/0029304 A1 * | 1/2013 | Vallejo Manyari | ..... | B43L 1/045 434/300 |
| 2013/0189658 A1 * | 7/2013 | Peters | ...................... | G09B 5/00 434/234 |
| 2014/0096617 A1 * | 4/2014 | Cummings | ............ | G09B 23/06 73/804 |
| 2016/0047724 A1 * | 2/2016 | Jeong | ...................... | G01N 3/24 73/784 |
| 2016/0189564 A1 * | 6/2016 | Al-Hiddabi | ............ | G09B 23/06 434/219 |

* cited by examiner

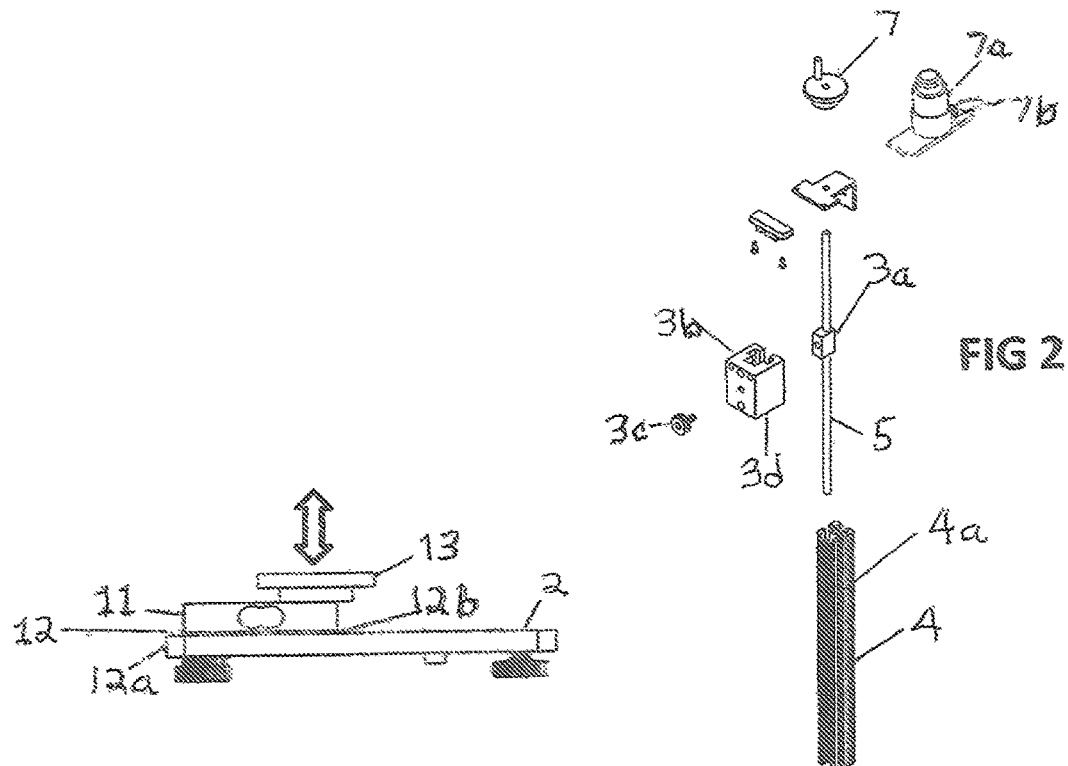
FIG 2
FIG 3
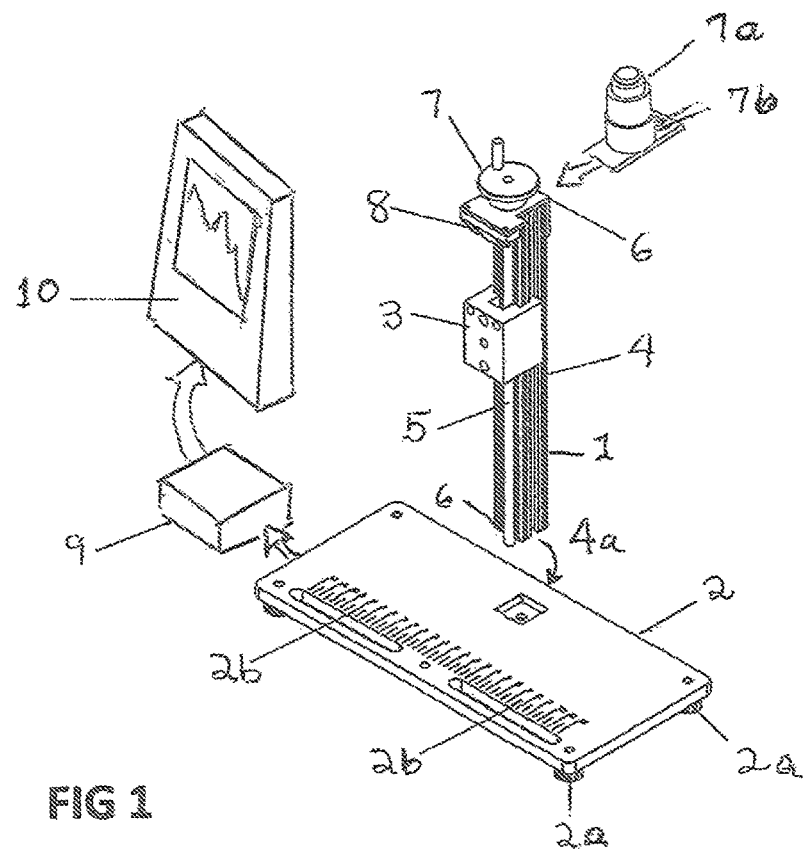
FIG 1

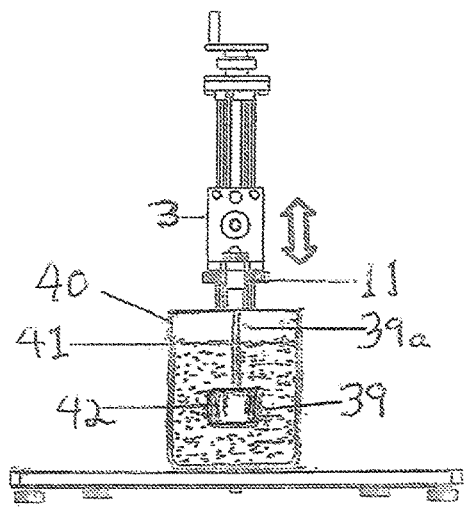
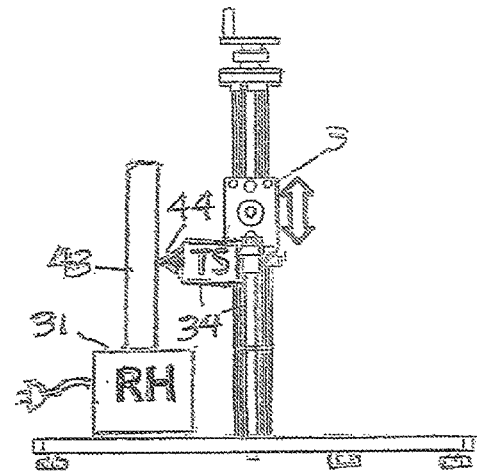
FIG 7        FIG 8
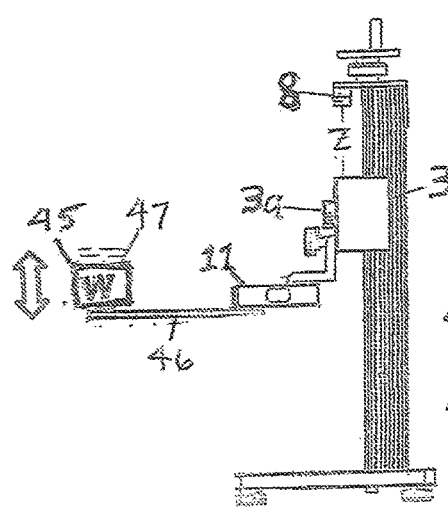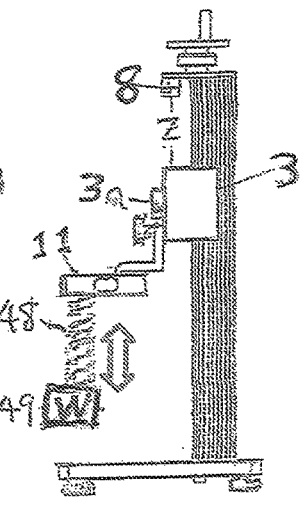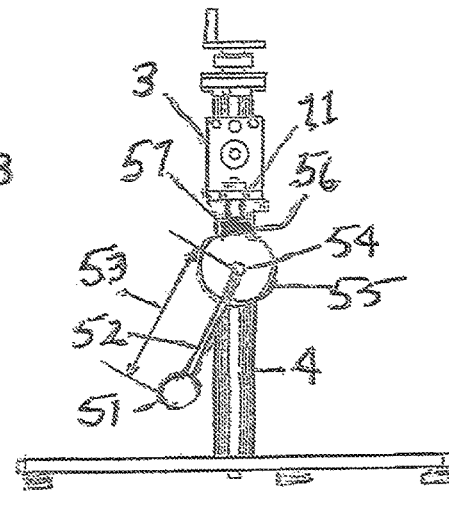
FIG 9(a)    FIG 9(b)    FIG 9(c)

RECONFIGURABLE LEARNING AID FOR PERFORMING MULTIPLE SCIENCE EXPERIMENTS

This application claims the benefit of U.S. Provisional Application No. 62/177,119, filed Mar. 6, 2015, which is hereby incorporated by reference in its entirety as if fully set forth herein.

BACKGROUND OF THE INVENTION

Current educational teaching systems, and, or products generally allow users to conduct instructional activities limited in scope to one or a few learning objectives. Although the examples provided have value in their individual scientific teaching outcomes, they are limited in use and are generally an expensive acquisition for teaching institutions if multiple experiments must be performed with separate, single objective laboratory demonstration equipment.

Needs exist for new and improved teaching systems, apparatus and method for experiments.

SUMMARY OF THE INVENTION

This invention is a reconfigurable apparatus with specially designed components that can be assembled and reassembled in various configurations allowing students to perform multiple physics and engineering experiments, recording and displaying results in near real time.

The reconfigurable learning aid, titled the Mentis Sciences Educational Toolkit, MSET, is a multifunctional tool capable of receiving removable attachments used to obtain physical, mechanical, thermal, and electrical properties of materials and systems: Towers to obtain and derive elastic moduli, stress, and strain; rotating disks to derive Coriolis properties; other platforms, like the base of the tower, to derive density; levers and pulleys to derive mechanical advantage, friction and drag are used to develop/derive the physical constants. The attachments are coupled to motors, sensors, load cells, computers, and software to capture the information. Each removable attachment can be configured to receive a multitude of fixtures to fasten samples to the attachments.

Another important aspect of this reconfigurable apparatus is its portability. The system can be supplied as a kit housed in a relatively small carrying case with foam inserts molded to the shape of the individual components, e.g. the baseplate, the linear drive, sensors, electronic interface modules, and assorted attachments. This allows the invention to be easily carried and stored, whether in a school or teaching facility, home, office or anywhere in the field. Accordingly, it is an object of the invention to provide educators and the educational community with an affordable, portable, integrated system that combines, in one package the ability to perform multiple hands-on science and engineering experiments at many levels: middle school, high school, community colleges and universities.

The invention includes constructing an linear drive system on a base, like a tower on a pedestal, with components that can be assembled and reassembled in various configurations based on joint designs that facilitate easy assembly and disassembly of component parts with structured receptacles, such as male and female insertable joints, and clamps, fasteners, screws, bolts or other means, to secure and stabilize the joints.

The invention provides a method for building linear drive structure by producing an internal track that supports a carriage movable along rails. Mounting a rotatable screw on bearings at the fore and aft ends of the drive structure and providing a coupling device incorporated into the carriage allows it to engage to or disengaged from the screw drive. Hardware associated with specific experiments is secured to the carriage and/or the base by clamps, fasteners, screws, bolts or other means.

Positioning the carriage is accomplished by rotating the screw drive with a crank at the second end of the linear drive structure or with motors connected to the screw at the first end or second end of the linear drive structure. The speed of the carriage is controlled by rheostats in the pedestal base, with "up and down" buttons located on the pedestal base.

Accurately sensing and recording positions of the carriage relative to the linear drive and base is accomplished by sensors. Optical or acoustic sensors embedded in the pedestal base at the first end of the linear drive or in the head at the second end of the linear drive are capable of transmitting and receiving transmitted waveforms from the sensors that are reflected from the top or bottom of the carrier, allowing computation of the carrier position.

Linear encoded magnetic strips or optically coded strips embedded into the linear drive structure correspond with sensors and readouts attached to the carrier.

Rotary encoders embedded in the head or base of the linear drive system "count" the number of rotations of the screw. That can be correlated to the positioning of the carriage. Wire or tape potentiometer sensors are embedded in the head or base of the linear drive system, with the pull out wire or tape affixed to the carrier. The amount of wire or tape extended or retracted is correlated to the position of the carrier. Measuring the forces of tension and compression uses load sensors on the carriage or pedestal base.

Data is communicated from the various positioning and load sensors to a central data display and recording system. Wires or other conductors are embedded in the linear drive structure and pedestal base for viewing and recording data in real time.

Wireless transmitters attached to the sensors enable the displaying and recording data from the reconfigurable apparatus.

Interfaces are included to common handheld communication devices such as smart phones or equivalent devices. Incorporation of software "Apps" specifically configured for the system allow user to record data and view results in real time.

For conducting experiments in velocity and acceleration, the carriage is detached from the screw drive. The carriage is hand held or held by a release mechanism and allowed to free fall under gravity, while recording data in real time from one of the carriage position sensors.

The carriage is also called a carrier herein.

Measuring impact resistance of a material is accomplished by aligning a horizontal extension from the carrier with a target material on the pedestal base, allowing the carrier to fall freely, while collecting and recording real time data from the position sensor, as the pad on the carrier extension impacts the material under investigation, including subsequent "bounces" off elastomeric materials.

For measuring elasticity and point of fracture of materials as well as compressibility to the point of buckling, the first end of the material is secured by fasteners and the load cell is secured to the pedestal base, and the second end to the carrier. With force applied by the upward motion of the carrier, extending of the material is measured by the carrier position sensor. Tension force is measured by the load sensor. Force applied by the downward motion of the carrier for compressing a material is measured by the carrier position sensor, and compression force measured by the load sensor.

For measuring the attractive and repulsive forces of magnets, a first magnet is attached to the movable carriage, and a second magnet to the load cell at the base. The upward and downward motion of the carriage generates tensile or compressive forces on the load cell depending on polarity of the magnets. The position data of the carriage is correlated with the load cell data to illustrate magnetic force.

Determining spring constants in serial or parallel configurations uses two or more springs joined in series or multiple springs secured in parallel with a single header. The springs are attached to the load cell secured to the pedestal base. The second ends are attached to the carrier by means of a common header. Force is applied by the upward motion of the carrier. Extension of the springs is measured by the carrier position sensor, and tension is measured by the load sensor.

For determining the shear strength of materials joined by adhesives or mechanical means, the first end of the one of the materials is attached to the load cell on the pedestal base, and the second material is attached the carriage. Upward motion of the carriage creates tension on the joined materials all the way to failure. The tension force measured by the load cell.

For measuring a three point flexure of materials, a flexible material like a metal strip is placed on two knife-edged support structures and aligned at its midpoint with a vertical extension of the load cell affixed to the carriage. Downward motion of the carriage depresses the strip. The flexure IS measured by the carrier position sensor, and the amount of force IS measured by the load sensor.

For measuring static friction, a ramp structure is attached at its first end to a rotatable joint on the vertical extension of the load cell attached to the carriage. The ramp is supported from beneath by placement of a knife-edged fulcrum attached to the pedestal base. The positioning of the carriage controls the angle of the ramp. A mass placed at the second end of the ramp is able to overcome static friction and slide along the ramp. Static friction is calculated by recording the angle of the ramp, which is directly related to the force vector on the mass to compute the static friction on the ramp.

For illustrating and measuring the principle of leverage, a ramp is held in a horizontal orientation, while the fulcrum is positioned by hand at different distances from the center line of the carriage. The following data determining the effects of leverage is computed from distance from the center line to the fulcrum, distance from the fulcrum to the mass at the second end of the ramp, the force on the load cell, and the mass of the object on the ramp.

For illustrating Gas Laws relating Pressure, Volume, and Temperature, a syringe is mounted vertically on the pedestal base. The stem of the plunger is attached to a load cell on the movable carriage. Pressure and temperature sensors are attached to the closed end of the syringe barrel mounted to the base. Increasing pressure on the stem of the plunger by lowering the carriage, recording the increase in load cell force and reduction in the gas volume by carriage position reveals the pressure and volume. Relationship of volume to temperature is determined by detaching the carriage from the screw drive so that the volume of gas can expand and lift the carriage when a resistive heater is employed to raise the temperature of the enclosed gas.

Demonstrating Pascal's Law uses two syringes of different diameters mounted vertically with closed ends secured to the pedestal base and a fluidic channel between them. By connecting the stem of one syringe with the load cell attached to the moveable carriage and by subsequently lowering the carriage, the stem of the other syringe, loaded with a known mass, is free to move and will ascend by an amount proportional to the diameters of the two syringes, with the load cell recording a force proportional the downward force of the known mass by an amount proportional to the diameters of the two syringes.

Computing hydrostatic pressure is demonstrated by attaching a rod at the first end to the load cell attached to the carriage and by lowering a mass with known volume at the second end of the rod into and under the surface of a liquid of known density in a container affixed to the pedestal base, and by recording the force on the load cell as the mass is raised and lowered in the liquid as the mass displaces a known volume of liquid and exerts variable force on the load cell which is proportional to the depth of the mass in the liquid and the density of the liquid.

Determining the Thermal Conductivity of a material, a rod with a heating element at its first end is affixed to the pedestal base in a manner parallel to linear screw drive, and is contacted by a probe and temperature sensor, mounted on the carriage body with the probe in physical contact with the rod, with resistive heating element generating heat at the base of the rod while the motion of the carriage with probe establishes the temperature gradients in the rod which relate to thermal conductivity.

A cantilevered flexible material or spring is held in free space by attachment, at the first end, to the load cell affixed to the carriage, with, at the second end, a mass affixed to the cantilevered flexible material, spring or elastomeric material which when extended and released creates an alternating force on the load cell in real time, illustrating harmonic motion.

A rod on a hub, at the first end, affixed to a rotatable joint on the vertical structure, attaches, at the second end, to an object with mass constituting a pendulum, able to swing back and forth, with the moveable carriage and load cell able to exert force on the hub, via a shoe that is conformal to and in contact with the radius of the hub.

These and further and other objects and features of the invention are apparent in the disclosure, which includes the above and ongoing written specification, with the claims and the drawings.

BRIEF DESCRIPTION OF THE DRAWINGS

Various objects, features, and attendant advantages of the present invention will become more fully appreciated and understood when considered in conjunction with the accompanying drawings.

FIG. 1 is a perspective view of the elements of the MSET reconfigurable learning aid.

FIG. 2 is an exploded view of the elements that make up the linear drive tower.

FIG. 3 is a side view of the load cell attached to the base.

FIG. 4 (*b*) is the side view of the moveable carriage tensioning a spring.

FIG. 4 (*c*) is a frontal view of springs in series.

FIG. 4 (*d*) is a frontal view of springs in parallel.

FIG. 4 (*e*) is a side view of the moveable carriage tensioning an elastomeric material to failure.

FIG. 4 (*f*) is a side view of the moveable carriage compressing a material to buckling.

FIG. 4 (*g*) is a side view of the moveable carriage tensioning two materials to measure shear strength of the adhesive of other joining methods.

FIG. 5 (*b*) is the side view of the load cell extension supporting a balance lever on fulcrum.

FIG. 5 (*c*) is the side view of the load cell extension altering the angle of a ramp to measure static friction of an object on the ramp.

FIG. 5 (*d*) is a perspective view of the load cell extension positioned to depress the midpoint of a metal strip between two supports to measure flexure strength.

FIG. 6 (*b*) is a frontal view of the moveable carriage with load cell attached to the piston of a syringe containing gas with resistive heater to illustrate the Gas Laws.

FIG. 6 (*c*) is a frontal view of the moveable carriage with load cell attached to the piston of a syringe containing a liquid linked to a second syringe to illustrate Pascal's Law.

FIG. 7 is a frontal view of the moveable carriage with load cell extension linked to an extended object in a liquid to illustrate the principle of buoyancy.

FIG. 8 is a side view of a movable carriage with temperature sensor and probe to measure the thermal conductivity of a rod heated from below.

FIG. 9 (*a*) is the side view of the moveable carriage with a cantilevered weight on a flexible strip to illustrate harmonic motion of vibration.

FIG. 9 (*b*) is the side view of the moveable carriage with a weight attached to a spring to illustrate harmonic motion.

FIG. 9 (*c*) is frontal view of a swinging pendulum attached to the tower, with moveable carriage load cell applying force to dampen the motion.

FIG. 11(*b*) is a perspective view of the base with the tower removed showing the motor axle projected above the base plane for attachment of other experiments demonstrating rotary motion.

FIG. 11(*c*) is a top view of a rack and pinion experiment where a drive gear is attached to the motor axle to illustrate conversion of rotary motion to linear motion.

FIG. 11(*d*) is top view of a piston experiment where the piston rod is attached to the motor axle illustrating rotary to linear motion and compression of gas in the piston.

DETAILED DESCRIPTION OF THE PREFERRED EMBODIMENTS

Figure 4A:
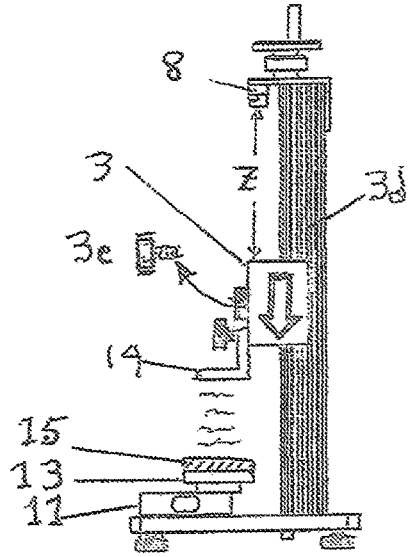
FIG. 4 (*a*) is a side view of a movable carriage free fall experiment to measure acceleration and the impact on various materials.

The present invention is a system of components that will allow the user to easily configure the apparatus into a multitude of experimental setups by attaching or rearranging components to meet desired learning objectives. The invention relates to a reconfigurable apparatus comprises a linear drive system with a movable carriage that is able to slide along a track within a frame. The carriage can be secured to a screw mechanism that moves it along the track by the rotation of the screw. The screw can be hand driven with a crank at one end of the track, or be driven by an electric motor and rotary encoder system that can move the carriage, while at the same time determining the position of the carriage on the track.

At the opposite end, the track is mounted on a base which supports the linear drive and other objects related to specific experiments. The linear drive, mounted vertically like a tower on the horizontal base, is adaptable to many experimental configurations. The base itself, without the tower, contains a motor, motor controls, switching devices, and data links, which allow it to be used for additional experiments.

The linear drive track can be mounted vertically on the base, the preferred orientation, but can be mounted horizontally, or in any position that is required for the specific experiment. In certain experiments, when the linear drive is in a vertical orientation, the carriage linkage to the screw-drive can be decoupled to allow the free fall of the carriage under gravity. This mode, for example, would allow experiments related to the impact of the carriage on various materials to measure elasticity. Both the carriage and the base contain attachment points, where additional devices and structures related to specific experiments can be assembled and secured.

In addition to using a rotary encoder attached to the screw drive to determine the position of the carriage, the position of the carriage can also be determined by an infrared, acoustic, RF, laser or other type of sensor placed at one end of the track to record the distance between the carriage and the end of the track.

An alternative means of determining position is with linear encoder strips imbedded in the frame that are in contact with the carriage by means of a sliding contact point. A linear encoder is sensor attached to the carriage that reads a scale, embedded in the frame, for converting position into an analog or digital signal. This allows recording of position data whether the carriage is stationary or moving. All of these variants used to establish position will be referred to as the position sensor. Another important sensor is a load sensor which can be attached to the base or to the carriage. This sensor measures and records force data required for both static and dynamic experiments.

An important aspect of the invention is the means for acquiring, recording, and displaying the data from the various experiments. The invention can utilize readily available data acquisition devices, with wired or wireless interfaces to common handheld communication devices such as smart phones or equivalent devices. An "App" configured for the system is able to record data that allows the user to view results in real time. The software may also allow the user to edit and graph data for use in the class.

In a classroom situation, one embodiment of the software system would allow a teacher's system to act as the master unit with all student systems performing as slaves to the teacher, but with the flexibility and capability to switch from the teacher, being the master, to a student or team able to demonstrate individual test results during a classroom session.

The flexibility of the system will allow it to be adapted to a wide variety of technical and or scientific fields at varying levels of complexity, serving as an instructional apparatus for elementary grades to advanced college studies.

FIG. 1 is a prospective view of the major components of the reconfigurable learning aid showing a linear screw drive system 1, mounted to a baseplate 2, with adjustable feet 2a for leveling the base, with slots 2b in the base for mounting experimental fixtures, with carriage 3 mounted on a track, within frame 4, able to be connected to screw 5 secured at both ends 6, with lower end and the frame itself secured in the baseplate at 4a, with a hand crank 7 for rotating the screw, a distance measuring device, position sensor 8 mounted to the top of the frame, an optional wireless connection apparatus 9, transferring data to a computer, smart phone, or other PDA 10 for computing and displaying results. FIG. 7a is an electric motor with leads 7b, capable of driving the screw in the liner drive as an alternative to the hand crank.

FIG. 2 is and exploded view of the linear drive showing frame 4, screw 5, hand crank 7, alternative electric motor 7a and leads 7b, carriage 3, with carriage link to screw 3a, with tapped holes 3b for mounting experimental fixtures, removable bolt 3c for securing carriage 3 to carriage link 3a, optional motor actuator system 7a replacement for hand crank 7 for a more automated system. An alternative means comprising determining position is to have a sliding contact, 3d, physically interacts with encoder strip 4a embedded in frame 4.

NOTE: In the figures that follow, only the hand crank 7 is shown, but it should be assumed that the hand crank can be replaced by the motor and rotary encoder system 7a with power and sensor data leads 7b.

FIG. 3 is a side view of the force sensor or load cell 11 mounted on baseplate 2 with a spacer 12 mounted between the baseplate and force sensor on one end of the sensor 12a, lifting the sensor body above the baseplate such that the opposite end 12b is cantilevered and free to move up or down depending on the nature of the experiment (vertical tension or vertical compression). A platform 13 mounted on the force sensor at location 12b is the interface of force sensor 11, with specific experiments measuring tension and compression.

FIG. 4(a) is a side view of experiments related to the Laws of Motion, and Material Elasticity, impact of an object with mass on a material, to measure material elasticity. FIG. 4(a) shows carriage 3 (the object), with an L-shaped component 14 attached, and with bolt 3c removed, therefore able to fall freely under gravity along track 4, impacting the material to be tested, 15, mounted on pedestal 13. The force sensor 11 is thus able to record the instantaneous force of impact. The instantaneous location z of the object with known mass is measured by the position sensors 8, 3d, and 4a. In dynamic testing, z can be correlated with time, allowing computation of the object's velocity, acceleration, and, with a given mass, the kinetic energy, and momentum.

As the objects strikes the elastic material 15, mounted on pedestal 13, the instantaneous force of impact is recorded by sensor 11, and based on the elastic character of the material will cause the carriage 3 to bounce in the opposite direction, wherein the record of its travel in the upward direction is also recorded (distance, time, velocity and de-acceleration). The experiment is thus able to demonstrate many aspects of mechanical motion, as well as the damping effect of elastic materials.

Figure 4B:
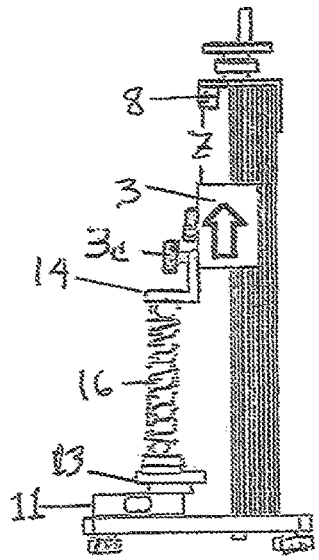

FIG. 4(b) is a side view of an experiment Springs under Tension, with the learning aid apparatus set up in a manner similar to that in the previous set up in FIG. 4(a), with the top of a spring 16 attached to L-shaped component 14, and the bottom attached to pedestal 13. The figure shows the elongation of spring 16 where bolt 3c connects carriage 3 to the screw drive 5, enabling the carriage 3 to be raised, thus putting tension on spring 16, with the force of the tension measured by sensor 11, distance z traveled by sensor 8, allowing the spring constant k (stiffness) to be computed using Hooke's Law.

Figure 4C:
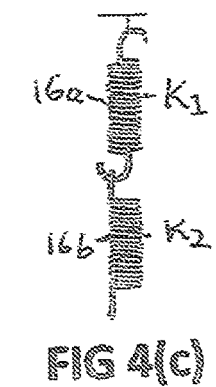
Figure 4D:
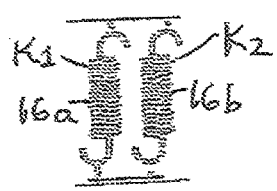
Figure 4E:
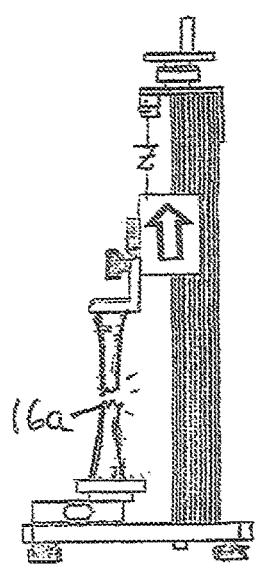

FIG. 4(c) shows two springs 16a and 16b, in series, with constants K1 and K2, where K for the ensemble in series can be determined by Equation 1, $K_{series}=(K1)(K2)/(K1+K2)$. FIG. 4(d) shows two springs 16a and 16b, connected in parallel, again with constants K1 and K2 where the K for springs in parallel can be determined by Equation 2, $K_{Parallel}=K1+K2$. FIG. 4(e) shows the extension of an elastic material 16a under tension all the way to fracture, where data is recorded by position sensors 8 (elongation) and sensor 11 (tension force) determine stress versus strain, illustrating Young's Modulus.

The same setup can be used to measure Tensile Strength, the case of a non-elastic material like a wire is put under tension all the way to failure, to determine tensile strength. Again, sensors 8 and 11 are used to record elongation and tension at failure.

Figure 4F:
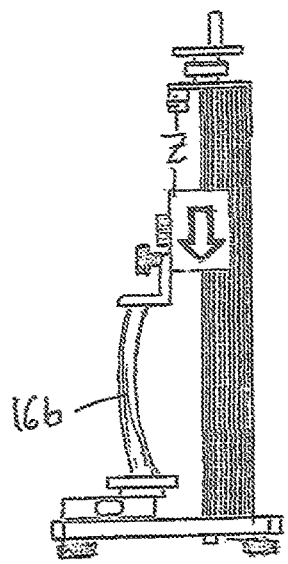

FIG. 4(f) shows an experiment Materials under Compression where a material 16b under investigation is attached to the carriage and load cell as in FIG. 4(e) but the carriage motion is downward, creating a compressive force, all the way to buckling, where position sensors 8 records change in length under compression and the load sensor 11 measures the force of compression to buckling and failure.

Figure 4G:
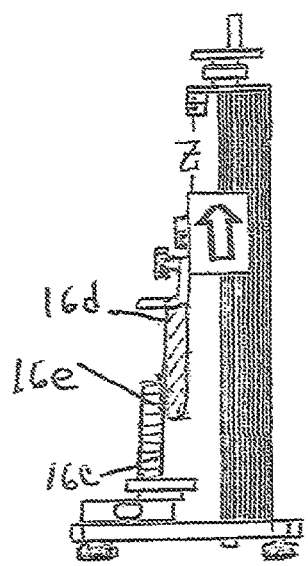

FIG. 4(g) shows a Lap Shear Test, where two materials, 16c attached to pedestal 13, and 16d attached to bracket 14, bonded together with adhesive 16e or other attachment mechanism, are placed under tension by the linear drive 1, to measure the adherence of the bonding material. The fracture of the bond at some load, measured by cell 11, indicates the strength of adhesion. A Double Lap Shear Test can be accomplished with a similar set up, with one material sandwiched between two materials and attached with adhesives or other mechanical means.

Figure 5A:
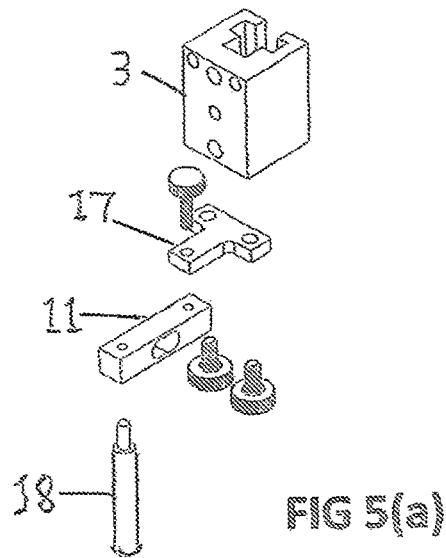
FIG. 5 (*a*) is a perspective view of the moveable carriage configured with a load cell with an extension.
Figure 5B:
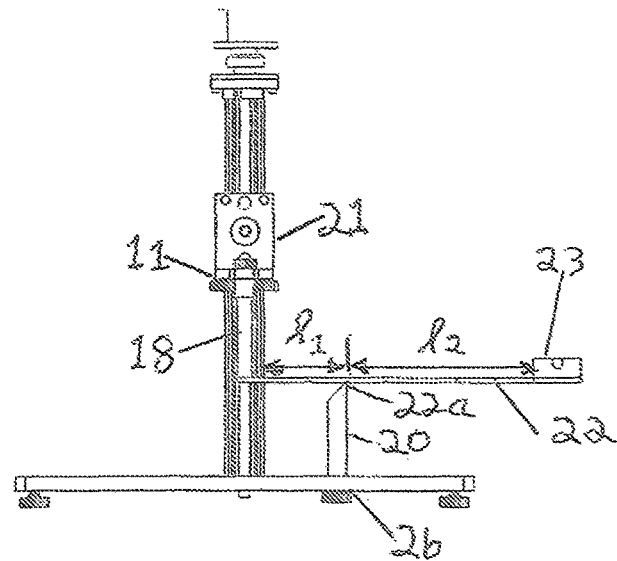

FIG. 5(a) is an exploded view of the carriage showing components that allow the force sensor 11 to be mated to the carriage 3 using components 17, with an extension 18 for transferring force to certain experiments where force measurements are required based on the positioning or motion of the carriage relative to the base 2. FIG. 5(b), as assembled, will be referred to as carriage force sensor assembly 21.

FIG. 5(b) is a frontal view an experiment to measure Mass Balance, where lever 22, a flat piece of metal with equally spaced notches 22a on one side, holds a known mass 23 at the opposite end, supported by fulcrum 20. The force sensor 11 will record forces due to mass 23 proportional to the ratio of distances $1_1$ and $1_2$ to the fulcrum from each end.

Figure 5C:
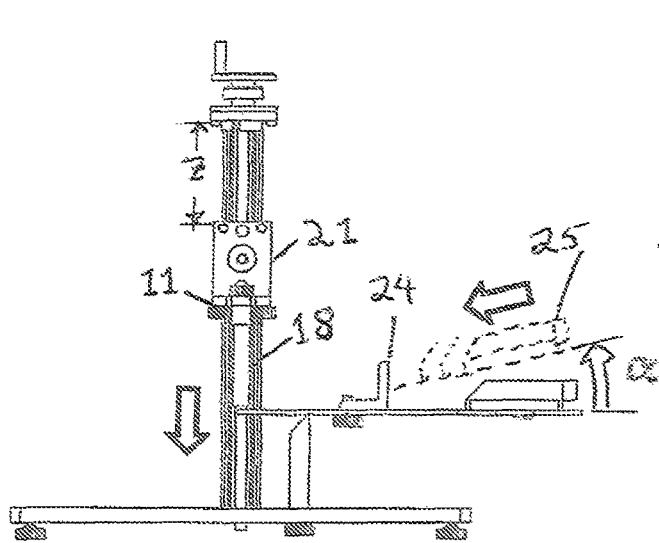

FIG. 5(c) is a frontal view of and experiment to measure Coefficient of Static Friction, where the apparatus configuration similar to that of FIG. 5(b), is used to measure the angle at which a mass begins to slide down a ramp. One end of the metal strip 22, now acting as a ramp, connects one end to extension 18 of the carriage 21, to mass 25 located at the opposite end, all supported by fulcrum 20. A sliding mass stop is located at 24. FIG. 5(c) shows the ramp 22 being tilted by the downward motion of carriage 21. At some angle α, mass 25 will begin a slide toward 24, allowing calculation of the coefficient of static friction, given the ability to compute angle α ($\alpha=\arctan(1_1)/(\Delta z)$), and the force of gravity g on mass 25 times tan α.

Figure 5D:
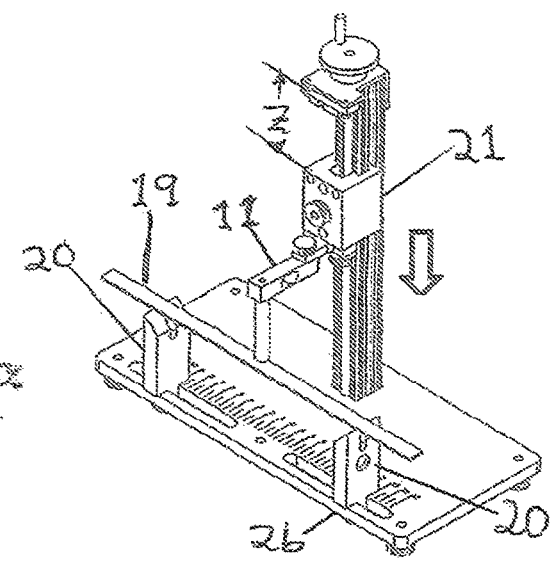

FIG. 5(d) shows a perspective view of a where the linear drive is used to measure Flexure Modulus of materials, here shown as a metal strip 19 resting on two knife edge supports 20, bolted to the base along slots 2b. The carriage force sensor assembly 21 is poised above strip 19 at a distance z measured by sensor 8 from the top of the linear drive system 1 to the top of the carriage force sensor assembly 21. The powered descent of carriage force 21 will cause the strip 19 to flex downward, where flexure of the material can be computed by values of distance z, correlated to the relative force exerted and measured by carriage force sensor assembly 21. A rod 19 could be tested in a similar manner.

Figure 6A:
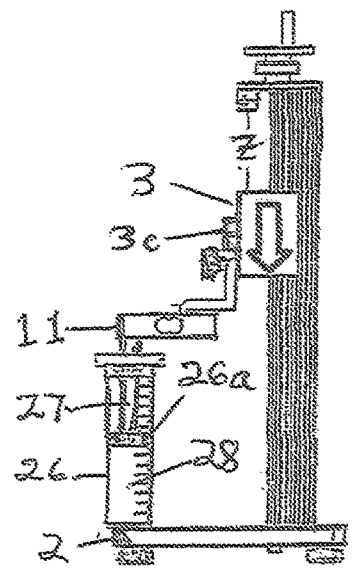
FIG. 6 (*a*) is a side view of the moveable carriage with load cell depressing the piston of a syringe containing gas to illustrate the Gas Laws.

FIG. 6(a) is a side view of syringe 26 mounted onto base 2 with plunger 27 attached to load cell 11, which is, in turn, mounted to the moveable carriage 3. When bolt 3c is inserted, the carriage is locked into the screw drive, allowing pressure to be exerted on by the screw drive onto the plunger 27 thus reducing the volume 28. With known area of the plunger face 26a, and amount of force measured by the load cell 11, the relationships demonstrate Boyle's Law, with the gas equation $P_1 \times V_1 = P_2 \times V_2$ (temperature being a constant).

Figure 6B:
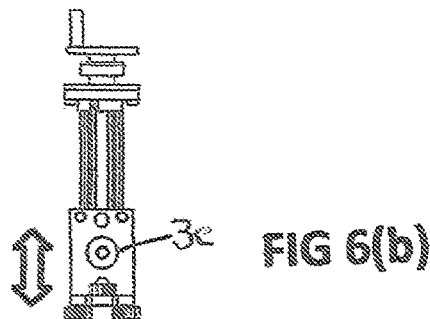

FIG. 6(b) shows a syringe 26 which will be used to demonstrate Gas Laws, relating gas volume to pressure and temperature. By moving the plunger 27 up and down, the pressure of the volume of gas 28 enclosed in the syringe may be measured by a pressure sensor 29 linked to the syringe through tube 30, where the recorded pressure changes are related to volume change.

For measurement of volume versus temperature, a resistive heater (RH) power supply 29 is able to induce heat into the lower region of syringe 26 with resistive heating element 30, to heat the volume of gas 28. Temperature sensor element 33 provides analog or digital data to the temperature sensor (TS) transducer 34.

When the carriage bolt 3c is removed, the plunger is free to rise if, for example, the gas is heated. Volume changes are quantified by distance traveled in the z direction as recorded by the position sensor 8 multiplied by the area of the face of the plunger head 26a. Again, change in volume is registered by linear change in the position of the ascending carriage 3 measured by position sensor 8, or linear actuator (3d/4a), thus demonstrating Charles's Law, with the gas equation $V_1/T_1 = V_2/T_2$ (pressure being a constant).

With bolt 3c in place, both pressure and temperature can be increased or decreased, by the movement of the carriage and application of the resistive heating, with volume measured by the position of the carriage, demonstrating the Ideal Gas Law, with the empirical equation $(P_1 \times V_1)/T_1 = (P_2 \times V_2)/T_2$ with all three parameters as variables.

Figure 6C:
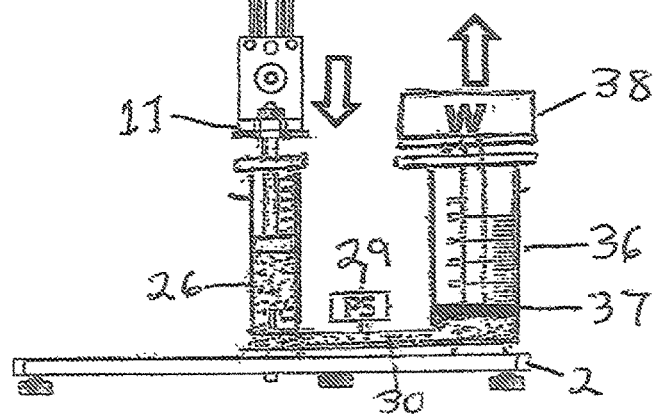

FIG. 6(c) is a demonstration of Pascal's Law showing how pressure in an enclosed liquid is transmitted undiminished to every portion of the fluid and the walls of the containing vessel. In this experiment, syringe 26, now containing a liquid is connected via a tube conduit 30 to a second larger diameter syringe 36, with a larger diameter plunger 37 mounted on base 2. Using two syringes of different diameters, the experiment will show the ratio of the input and output areas of the syringe plunger heads equals the ratio of the input and output force, where input force is measured by the load cell 11, and output force determined by a known weight 38 resting on the head of plunger. When carriage 3 descends driven by the screw drive 1 the weight 38 will ascend, and pressure will be recorded by pressure sensor 29.

FIG. 7 is a demonstration of Hydrostatic Pressure showing force on a buoyant body of known volume held under a liquid. The buoyant body 39 is connected to the load cell 11 via rod 39a, within vessel 40, containing water at level 41. The level of body 39 at level 42 is able to be raised and lowered by the carriage, with the buoyant force measured by load cell 11. The magnitude of the buoyant force is dependent on the density and height of the liquid column directly over body 39. The carriage and linear drive is used to raise and lower the body 39 to measure differences in buoyant force due to different heights of the liquid above body 39. Buoyancy force is measured with load sensor 11.

FIG. 8 shows an MSET configuration aimed at the study of thermal conductivity in a material. In Experiment 11, a bar of material 43 is connected at it base to resistive heater 31. Temperature sensor 34, connected to carriage 3, is attached to probe 44 which is in physical contact with bar 43. The linear drive 1 is able to position carriage 3, up and down bar 43 to measure the change in temperature at various distances from the resistive heater, allowing computation of the thermal conductivity of the material. Different materials 43 can be tested in this manner.

FIGS. 9(a), 9(b), and 9(c) are demonstrations of Harmonic Motion. In FIG. 9(a), a small weight 45 with known mass, is positioned at the end of a metal strap 46, attached to load cell 11 on carriage 3, which when manually displaced and released, vibrates vertically 47, wherein the digital readout of the load cell 11 is able to record the oscillating sinusoidal motion.

FIG. 9(b) shows the case of a spring 48, containing a weight 49 with known mass connected to the bottom of the spring 48, with the top of the spring anchored to the load cell 11. As with FIG. 9(a), when weight 49 is manually displaced and released, vibrates vertically 50, wherein the digital readout of the load cell 11 is able to record oscillating sinusoidal motion.

Figure 11A:
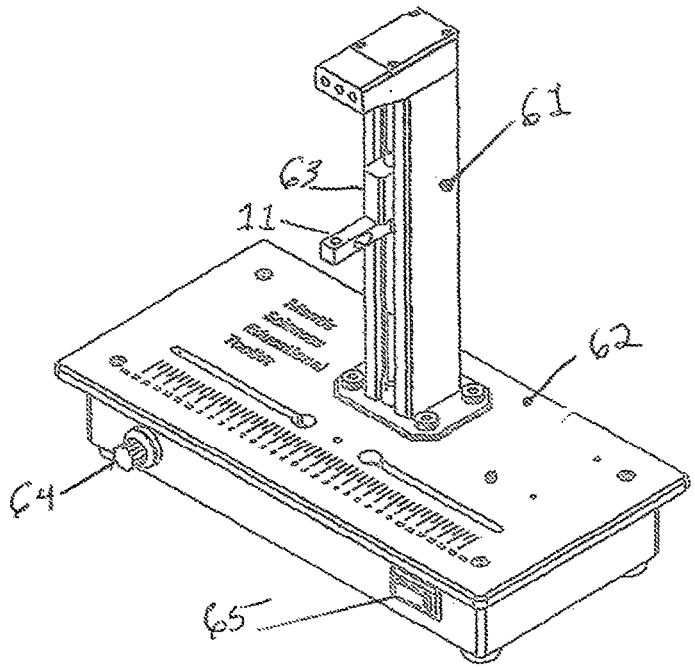
FIG. 11(*a*) is a perspective view of and alternate embodiment of the tower bolted to base, with screw drive motor in the base attached to and the linear screw drive in the tower.
Figure 11C:
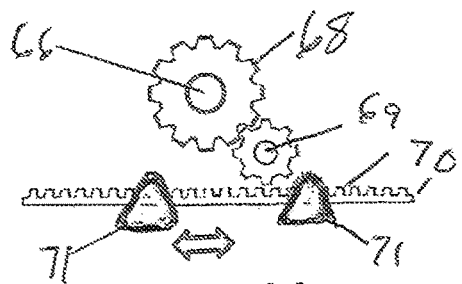

FIG. 11c shows the case of a pendulum of known mass 51, attached by a rod 52 of known length 53, rotatable around a pivot point 54, attached to an axle anchored in the linear drive frame 4. Rod 52 is attached to a wheel 55, which rotates around pivot point 54 when mass 51 is manually displace away from the center line and, when released. There is a shoe 56 attached to load cell 11, the bottom of which conforms to the circumferential shape of wheel 55, which is capable of exerting a force 57 on the wheel 55 when carriage 3 is positioned vertically by the screw drive 1. With no application of force, the pendulum will show an oscillatory motion, again detected by the load cell as shown below in the graphic on the left, which motion can be totally damped by application of force on shoe 56, until there is no oscillation at all as shown in the graphic on the right.

Figure 12:
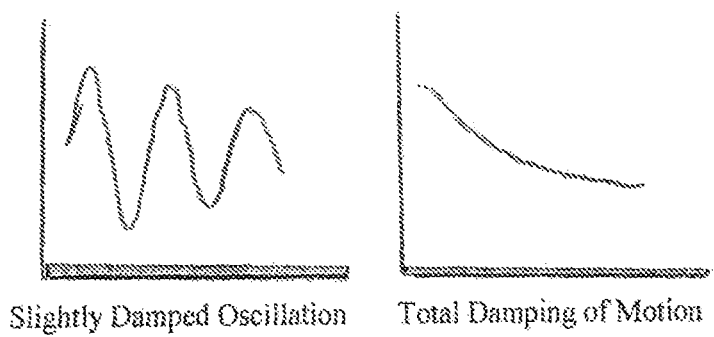
FIG. 12 shows a regime of attenuating oscillations on the left, a regime without oscillations on the right.

There is a critical value of damping which causes transition from regime of attenuating oscillations, as shown at the left of FIG. 12, to regime without oscillations at all as shown in the right hand graphic as shown in FIG. 12. The nature of this transition is related with properties of quadratic "dispersion equation" for pendulum oscillations:

$$-\omega^2 + 2i\gamma\omega + \Omega^2 = 0$$

There is critical frequency $\omega_0$ such that is $\gamma > \omega_0$, there are oscillations, if $\gamma < \omega_0$ there is no oscillation at all. Understanding of this transition is extremely important for many physical and engineering problems, including problem of the dynamic control.

Figure 10:
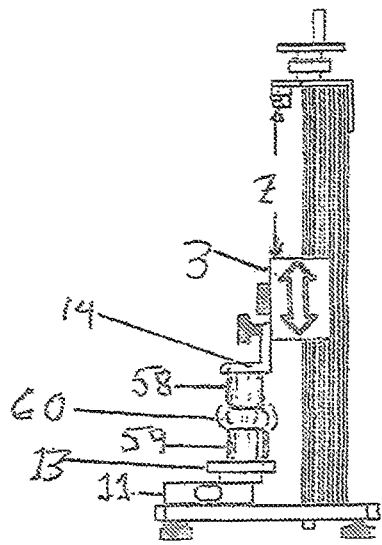
FIG. 10 is the side view of magnets affixed to the moveable carriage and the load cell pedestal on the base illustrating attraction and repulsion of magnetic forces.

FIG. 10 is and experiment in attraction and repulsion of Magnets and the measurement of Magnetic Forces. A permanent magnet 58 is affixed L-shaped component 14, and the bottom magnet 59 attached to pedestal 13. With bolt 3c connecting carriage 3 to the screw drive 5, carriage 3 is able to be raised and lowered, positioning the magnets at different distances from each other as measured by position sensor 8 along the z axis, with the force of the repulsion or attraction 60, depending on the orientation of the magnets, measured by load sensor 11.

FIG. 11(a) is a perspective view of and alternate embodiment of the tower structure 61, bolted to an alternative pedestal base 62, which contains the linear screw drive motor, rheostats, rotary encoders and controls. The alternative carriage 63 is shown attached to load cell 11 and moves along a track embedded in the alternative tower structure. On the front side of the base are shown a speed control dial 64 and switch 65 for directional control.

Figure 11D:
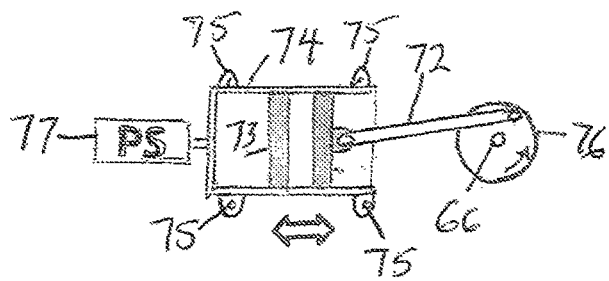
Figure 11B:
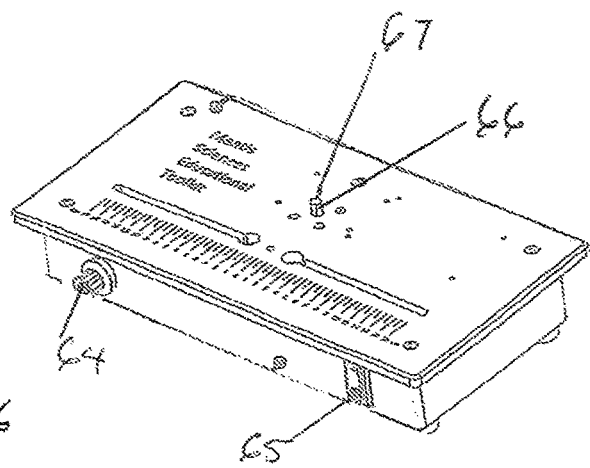

FIG. 11(b) is a perspective view of the base, with the tower removed, showing the motor axle 66 projected above the base plane for attachment of experiments which require a controllable rotary drive and a coupling design 67 for mating the various rotary motion experiments as well as mating of the linear screw when the tower structure 61 is removed.

FIG. 11(c) is a top view of a rack and pinion experiment where a drive gear 68 attached to the motor axle 66, with an intermediate drive gear 69 engaging the linear gear train 70 mounted to the pedestal base through structures 71 that secure the gear train, but allow the linear motion, illustrating conversion of rotary motion to linear motion.

FIG. 11(d) is top view of a piston experiment where the piston rod 72 attached to piston head 73 within a cylindrical piston 74, mounted to the pedestal by means of attachment points 75, is attached to the motor axle 66 via a wheel 76. The linear motion compresses gas in the cylinder which is measured by Pressure Sensor 77.

While the invention has been described with reference to specific embodiments, modifications and variations of the invention may be constructed without departing from the scope of the invention, which is defined in the following claims.

We claim:

1. Apparatus for conducting experiments comprising:
a reconfigurable structure with components that can be assembled and reassembled in various configurations allowing performance of multiple physics and engineering experiments, further comprising:
a linear drive structure having first and second ends, the drive structure further comprising a track and a movable carriage connected to the track within the drive structure,
wherein the carriage is detachable from the rotatable screw, and further comprising a hand hold or a release mechanism, connected to the carriage to allow the carriage to free fall under gravity when released, and an extension on the carriage aligned with, and able to strike, materials positioned on a platform attached to the base,
first and second bearings mounted at the first and second ends of the drive structure,
a rotatable screw connected to the first and second bearings at the first end and second ends of the drive structure for positioning the carriage along the track,
a stationary horizontal base for securing the linear drive structure perpendicular to the base as a tower on a pedestal, the base having an area or footprint large enough to maintain stability and support a variety of experiments,
the base configured with attachments for allowing secondary structures to be moved about and locked down to the base at defined locations depending on requirements, of the experiments,
position sensors sensing position of the carriage relative to the base,
attachment points and mechanisms on the carriage and on the pedestal base for securing hardware associated with specific experiments, and
a drive for rotating the screw.

2. The apparatus of claim 1, further comprising position markings on the base to aid in the positioning of the secondary structures.

3. The apparatus of claim 1, further comprising a mechanism within the carriage to detach it from the rotatable screw and to allow free fall of the carriage under gravity.

4. The apparatus of claim 1, further comprising rotary encoders that measure the angular position of the screw with the rotatable screw pitch number of turns required to move the carriage determining the position of the carriage, linear encoders embedded in the carriage track that record position electrically or magnetically with electrical contacts or magnetic materials located in the carriage, optical or acoustic sensors located at the first or second end of the linear drive structure capable of measuring distance to the carriage through reflection of optical or acoustic waves from the carriage, and wire or tape potentiometers embedded in the first or seconds end of the linear drive structure with the end of the wire or tape attached to the carriage.

5. The apparatus of claim 1, wherein the drive for rotating further comprises a crank at the second end of the linear drive structure, or with motors at the first end or second end of the linear drive structure, controlled by a rheostat connected to the motor that adjusts the position of the carriage in the linear drive system.

6. The apparatus of claim 1, wherein motors, drive systems, and controllers are mounted within the base and are able to be configured with experimental devices with or without the linear drive tower.

7. The apparatus of claim 1, further comprising wire or wireless devices for displaying and recording data from the reconfigurable structure.

8. The apparatus of claim 1, further comprising interfaces to common handheld communication devices, smart phones, personal digital assistants, or equivalent devices.

9. The apparatus of claim 8, further comprising software used in the devices configured for the system to allow user to record data and view results in real time.

10. The apparatus of claim 1, further comprising load sensors attached to the carriage and/or the base, the load sensors configured to measure forces of compression or tension for experiments.

11. The apparatus of claim 1, further comprising a load cell attached to the base and springs, elastomers, stretchable and compressible materials, including materials joined by adhesives or mechanical linkages, each of the materials having a first end and a second end, and being attached at the first end to the carriage and at the second end to the load cell attached to the base, wherein upward and downward motion of the carriage creates forces of tension or compression between the first and second ends to the point of fracture to the point of buckling.

12. The apparatus of claim 1, further comprising a load cell attached to the base and a first magnet attached to the carriage, with a second magnet attached to the load cell, wherein the magnets are attracted or repelled depending on polarity by upward and downward motion of the carriage and the attraction or repulsion is sensed by the load cell.

13. The apparatus of claim 1, wherein the downward motion of the carriage provides downward force extension on a load cell and depresses a flexible material, supported between two knife-edged support structures, or changes an angle of a ramp on a fulcrum with a first end of the ramp attached to the carriage and a second end supporting a slideable mass, or forces a plunger of a syringe attached to the base to pressurize a gas in a barrel of the syringe, further comprising sensor heads accessible to the gas in the syringe monitor the gas temperature and pressure, and resistive heaters attached to or in the barrel of the syringe capable of heating the gas in the syringe.

14. The apparatus of claim 1, further comprising a syringe body containing a liquid with a fluidic channel to the base of a second syringe body, wherein the syringe bodies are mounted vertically at closed ends to the base, with the plunger of the second syringe free to move vertically with increasing pressure generated by the first syringe, generated by the downward motion of the moveable carriage.

15. The apparatus of claim 1, further comprising a vertical rod having a first end affixed to a load cell on the moveable carriage and attached at a second end to an object with extended volume immersed in a liquid held in a container affixed to the base.

16. The apparatus of claim 1, further comprising a probe affixed to a temperature sensor on the moveable carriage and in physical contact with a rod, mounted on the base and parallel to the linear drive, with a resistive heating element generating heat at the base of the rod.

17. The apparatus of claim 1, further comprising a cantilevered flexible material, or spring, or elastomeric material held in free space by attachment at a first end to a load cell affixed the moveable carriage, and having at a second end a mass affixed to a cantilevered flexible material or spring, which when extended and released creates an alternating force on the load cell.

18. The apparatus of claim 1, further comprising a rod having a first end affixed to a disk supported by a rotatable joint on a load cell attached to the carriage and having a second end attached to an object with mass constituting a pendulum, able to swing back and forth and exert an alternating force on the load cell, further comprising a pad mounted on the carriage in contact with an edge of the disk able with the application of force to damp the oscillations of the pendulum.

19. The apparatus of claim 1, wherein the linear drive structure comprises a tower structure and the track is embedded within the tower structure, wherein the means for rotating the screw drive comprise a motor and controls embedded in the base, with knobs and switches mounted on an exterior of the base to control speed and direction of movement of the carriage mounted on the track within the tower structure, wherein the tower structure is removable from the base, and wherein the screw drive is connected to an axle of the motor through a detachable coupling that allows removal of the tower from the base.

20. The apparatus of claim 19, wherein the tower is secured to the base with fasteners and is removable from the base, exposing the coupling to the axle of the motor to drive experimental apparatus affixed to the base.

21. A method comprising:
constructing a tower with a linear drive system on a pedestal base, providing components that can be assembled and reassembled in various configurations based on joints that facilitate easy assembly and disassembly of component parts with structured receptacles, male and female insertable joints, and clamps, fasteners to secure and stabilize the joints, providing in the tower a linear drive structure, attaching an internal track with rails in the tower, supporting a movable carriage along the rails, mounting a rotatable screw on bearings at the fore and aft ends of the drive structure, providing a coupling device on the carriage allowing the carriage to engage to or disengage from the screw drive to allow the carriage to free fall under gravity when released, and an extension on the carriage aligned with, and able to strike, materials positioned on a platform attached to the base, securing hardware associated with specific experiments to the carriage and/or the base by clamps or fasteners, positioning the carriage by rotating the screw drive with a crank at one end of the linear drive structure, or with a motor connected to the screw at one end of the linear drive structure, providing a rheostat and controlling speed of the carriage by the rheostat and providing "up and down" buttons located on the base or the tower, accurately sensing and recording position of the carriage relative to the linear drive and base, embedding optical or acoustic sensors in the base at an end of the linear drive, transmitting and receiving transmitted waveforms from the sensors that are reflected from the carriage and computing carriage position, embedding linear encoded magnetic strips or optically coded strips into the linear drive structure, with corresponding sensors and readouts attached to the carriage, embedding rotary encoders in the linear drive counting the number of rotations of the screw, correlating the number of rotations to the positioning of the carriage, embedding retractable wire or tape potentiometer sensors in the linear drive system, affixing pull out wire or tape to the carriage, and correlating an amount of wire or tape extended or retracted to a position of the carriage, measuring the forces of tension and compression by placing load sensors on the carriage or on the pedestal base, communicating data from the position and load sensors to a central data display and recording the data, attaching wires or other conductors embedded in the linear drive structure and pedestal base to the display for viewing and recording data in real time, attaching wireless transmitters to the sensors and communications, displaying and recording data from the sensors on the reconfigurable apparatus, providing interfaces to mobile communicating devices, smart phones, personal data assistants and equivalent devices, and incorporating software applications specifically configured for the system and allowing users to record data and view results in real time.

* * * * *